US012673662B2

(12) United States Patent
Jehle

(10) Patent No.: US 12,673,662 B2
(45) Date of Patent: Jul. 7, 2026

(54) METHOD FOR CHANGING FROM ELECTRICAL OPERATION TO HYBRID OPERATION IN A VEHICLE HYBRID DRIVE AND VEHICLE HYBRID DRIVE

(71) Applicant: Vitesco Technologies GmbH, Regensburg (DE)

(72) Inventor: Martin Jehle, Pettendorf (DE)

(73) Assignee: Vitesco Technologies GmbH, Regensburg (DE)

( * ) Notice: Subject to any disclaimer, the term of this patent is extended or adjusted under 35 U.S.C. 154(b) by 496 days.

(21) Appl. No.: 18/363,377

(22) Filed: Aug. 1, 2023

(65) Prior Publication Data

US 2023/0373461 A1    Nov. 23, 2023

Related U.S. Application Data

(63) Continuation of application No. PCT/EP2022/052196, filed on Jan. 31, 2022.

(30) Foreign Application Priority Data

Feb. 1, 2021    (DE) ..................... 10 2021 200 855.0

(51) Int. Cl.
*B60W 20/13*         (2016.01)
*B60W 10/02*         (2006.01)
(Continued)

(52) U.S. Cl.
CPC ............ *B60W 20/13* (2016.01); *B60W 10/02* (2013.01); *B60W 10/06* (2013.01); *B60W 10/08* (2013.01);
(Continued)

(58) Field of Classification Search
CPC ...... B60W 10/02; B60W 10/06; B60W 10/08; B60W 10/26; B60W 20/13; B60W 20/19; B60W 20/40
See application file for complete search history.

(56) References Cited

U.S. PATENT DOCUMENTS

| | | | | |
|---|---|---|---|---|
| 8,187,146 B2 * | 5/2012 | Allgaier | ................ | B60W 20/00 180/65.28 |
| 8,398,515 B2 * | 3/2013 | Sartre | ..................... | B60K 6/30 475/5 |

(Continued)

FOREIGN PATENT DOCUMENTS

DE        102015222692 A1      5/2017

OTHER PUBLICATIONS

International Search Report and Written Opinion dated May 12, 2022 from corresponding International Patent Application No. PCT/EP2022/052196.
(Continued)

*Primary Examiner* — Jeffrey J Restifo

(57)                ABSTRACT

A method for changing from electrical operation to hybrid operation in a vehicle hybrid drive is provided. The method includes detecting an increase in a target traction power and starting the internal combustion engine. When the internal combustion engine starts, the method includes outputting a positive torque by generating an increasing generator power. The generator power is used together with an electrical power of a storage unit for generating electrical traction power. The generator power is generated while the internal combustion engine is not yet fully coupled to an output. The method includes fully coupling the internal combustion engine to the output after the generation of the increasing generator power has begun. After the internal combustion engine has been fully coupled, the method includes reducing the electrical power of the storage unit to a non-positive
(Continued)

value and adjusting the generator power in accordance with a predetermined energy balance.

20 Claims, 1 Drawing Sheet

(51) Int. Cl.

| | |
|---|---|
| *B60W 10/06* | (2006.01) |
| *B60W 10/08* | (2006.01) |
| *B60W 10/26* | (2006.01) |
| *B60W 20/19* | (2016.01) |
| *B60W 20/40* | (2016.01) |

(52) U.S. Cl.
CPC ............ *B60W 10/26* (2013.01); *B60W 20/19* (2016.01); *B60W 20/40* (2013.01); *B60W 2540/10* (2013.01); *B60W 2710/0677* (2013.01); *B60W 2710/086* (2013.01); *B60W 2710/244* (2013.01)

(56) References Cited

U.S. PATENT DOCUMENTS

| | | | | |
|---|---|---|---|---|
| 9,099,882 | B2 * | 8/2015 | Lammers | B60W 10/26 |
| 9,352,739 | B2 * | 5/2016 | Gibbs | B60L 58/12 |
| 9,580,062 | B2 * | 2/2017 | Perkins | B60W 10/26 |
| 10,358,123 | B2 * | 7/2019 | Lee | B60K 6/387 |
| 11,391,331 | B2 * | 7/2022 | Bucknor | B60W 10/30 |
| 12,152,641 | B2 * | 11/2024 | Jones | B60L 3/0023 |
| 2023/0373461 | A1 * | 11/2023 | Jehle | B60W 20/13 |

OTHER PUBLICATIONS

German Office Action dated Nov. 11, 2021 for corresponding German Patent Application No. 10 2021 200 855.0.

* cited by examiner

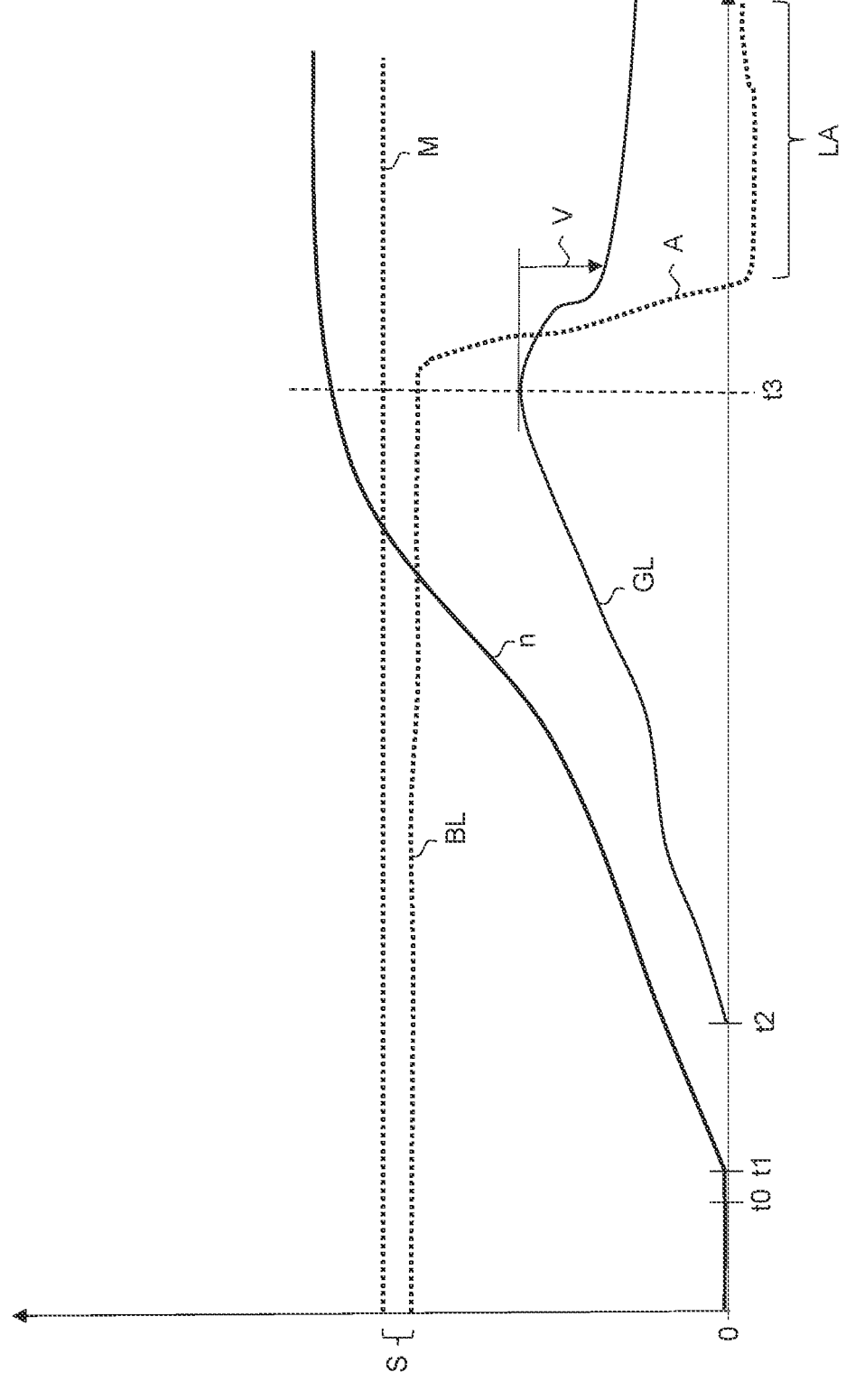

METHOD FOR CHANGING FROM ELECTRICAL OPERATION TO HYBRID OPERATION IN A VEHICLE HYBRID DRIVE AND VEHICLE HYBRID DRIVE

CROSS-REFERENCE TO RELATED APPLICATIONS

This application claims the benefit of PCT Application PCT/EP2022/052196, filed Jan. 31, 2022, which claims priority to German Application 10 2021 200 855.0, filed Feb. 1, 2021. The disclosures of the above applications are incorporated herein by reference.

TECHNICAL FIELD

The disclosure relates to a method for changing from electrical operation to hybrid operation in a vehicle hybrid drive and vehicle hybrid drive.

BACKGROUND

Hybrid vehicles are known to be equipped with an electric drive and an internal combustion engine. The transition from fully electric driving to hybrid driving is necessary specifically upon an increase of the driver's request, when the requested wheel torque cannot be provided by the electric drive. If the internal combustion engine is started to allow hybrid operation, this may then require a certain time of approximately 1 second. A reverse movement may therefore result if the electric drive reaches its maximum power when the internal combustion has not yet been started, as well as a further reverse movement which results due to the coupling of the started internal combustion engine.

SUMMARY

The disclosure describes a way of providing improved driving comfort when transitioning from electric to hybrid operation.

When transitioning from electric drive to hybrid drive, a temporary series hybrid drive is proposed, which can be achieved by the actuation of the generator (whilst the internal combustion engine is not coupled or not yet fully coupled to the output of the vehicle). If, following engine start-up, the internal combustion engine is in a state from which it runs independently or the torque generated by the internal combustion engine exceeds its own torque loss, the generator (for example a starter generator) is set into a generator mode, in which this generator power is generated. This generator power is provided to the traction motor (together with power that is fed from an electrical storage unit, such as an accumulator). A higher electrical power thus results, which is available for the electric drive, so that a greater torque is available already before the (full) coupling of the internal combustion engine. The torque is greater by an amount corresponding to the generator power. The electrical traction power corresponds here substantially to the sum of the electrical power that is drawn from the storage unit and the power generated by the generator (generator power). With regard to the generator power, this corresponds to a series hybrid drive, since the proportion of the traction power of the electric drive that is generated by the generator is fed from the not yet fully coupled internal combustion engine, in that this outputs mechanical power to the generator already before it is fully coupled. The internal combustion engine is then fully coupled and thus outputs mechanical energy directly to the output, whereby the series hybrid drive is ended. For this reason, the series hybrid drive occurs only until the internal combustion engine is fully coupled, and therefore this can also be referred to as a temporary series hybrid drive. For full coupling, the torque generated by the internal combustion engine or the generator power generated by the generator can be further increased, starting with the output of a positive torque by the internal combustion engine. This rise can be designed according to a predefined ramp. A desired, smoother transition between electric driving and hybrid driving results, and thus improved driving comfort.

Until full coupling and once a positive torque has begun to be output by the internal combustion engine, an excess of electrical energy is generated (by the generator or generally by a generator device). The generator power or the generator torque is built up and the electrical traction power is increased. This excess of generator power (i.e., the generation of the generator power for conversion as electrical traction power) is ended directly after the full coupling, since then the internal combustion engine can provide some of the desired target power (as traction power). The generator device may then continue to remain in generator operation, but with a lower torque than before, i.e., oriented towards the vehicle electrical system supply and which is not intended for additional generation of a traction torque.

A method for changing from electrical operation to hybrid operation in a vehicle hybrid drive is therefore disclosed. The method initially provides detection of an increase in a target traction power. The traction power is detected via an input element. For example, if the target traction power is no longer fully above a maximum power that can be drawn maximally from an electrical storage unit, the internal combustion engine is then started. The value of the target traction power from which the internal combustion engine is to be started can be predetermined, can be dependent on a currently maximally drawable power of a storage unit or can characterize this, and can be dependent on the temperature or the state of charge of the storage unit.

The increase in the target traction power can be set by detection of an actuation strength of a drive actuation element. For example, the actuation strength of an accelerator pedal or a throttle twist grip or a lever can be detected. Furthermore, a driving signal can be detected at an interface of a driver assistance or autonomous driving system, where the driving signal reflects the target traction power or a variable derived therefrom (for example, target acceleration, target torque, target drive power or target speed).

The internal combustion engine is started, for example, by generating a starting torque. For example, fuel starts to be injected into the internal combustion engine when the internal combustion engine is started. The starting torque may be generated in various ways. The starting torque may be generated by activating a starting device, which generates the starting torque and outputs it to the internal combustion engine. The starting device can be a starter generator or a sprocket starter or a pneumatic or spring-based (mechanical) energy storage unit. The starting torque can be generated by activating a starter generator or by activating a sprocket starter (for example, if the generator is provided separately). The starting torque can be generated by activating a pneumatic or spring-based energy storage unit. Furthermore, the starting torque can be generated (or generally the internal combustion engine can be started) by performing a direct start (with injection and ignition).

The internal combustion engine then starts to turn, where the rotary speed steadily increases, for example, according to a predetermined profile. The internal combustion engine reaches an operating state, in which it can run independently. This operating state can be characterized in that the internal combustion engine starts to output a positive torque. For example, this operating state is characterized by a torque generated by the internal combustion engine, which is greater than the torque loss (at the same time) of the internal combustion engine. The operating state can be characterized, for example, by a predetermined speed (limit) of the internal combustion engine or a minimum speed, which may be dependent, for example, on the delivered torque of the internal combustion engine. The operating state in which the internal combustion engine can run independently is characterized, for example, by the state in which the internal combustion engine (separated from other drive components, such as the output) can run independently. The operating state in which the internal combustion engine can run independently can also be characterized by the state in which the internal combustion engine connected to the generator device but may be separated from other drive components, such as the output, can run independently.

If thus aforementioned operating state is reached, the generation of a rising generator power by a generator device is then started. In the case of a starter generator, the generator device may correspond to the starter device and the two functions realized by one controller. However, the starting torque may also be generated by a starter device, for example a sprocket starter, whereas the generator power is generated by a further device, such as a generator device, for example, an alternator. The generator device can therefore realize the function of generation of the starting torque and the generator power, or can—for example, on account of the actuation or the expression—realize only the function of the generation of the generator power, without being able to generate a starting torque.

The generation of an increasing generator power by a device can be provided by appropriate actuation of the generator device, for example by the increase of the excitation of the generator. The generator power may be generated according to a predetermined ramp, where the ramp may depend on operating parameters of the drive (temperature of the internal combustion engine, of an electrical storage unit—see below—, COS or HOS of the storage unit, etc.).

The generator power is used, together with an electrical power that is drawn from a vehicle-side electrical storage unit, to generate electrical traction power. This can be, for example, a traction accumulator, such as a high-voltage accumulator, or also a super cap device. The electrical power that is drawn from the electrical storage unit can also be referred to as accumulator power or battery power. If, for example, the electrical storage unit has reached its maximally deliverable power, the traction power can still continue to be (increasingly) elevated by adding the generator power to generate the traction power. The generator power is generated here whilst the internal combustion engine is not yet or not yet fully coupled to an output. Before the internal combustion engine is not or not yet fully coupled to the output, the generator power is actuated in such a way that it, together with the power of the electrical storage unit, corresponds to the target traction power with minimal deviation. In this way, the driver's request can be met in this temporary series hybrid operation, or an acceleration which exceeds the acceleration that would be possible with the electrical storage unit alone can be determined at least for the driver. It can be provided that the generator power is provided increasingly in accordance with the increase of the target traction power, according to a predetermined increase or the like. The traction power is preferably steadily increased, in particular according to a predetermined ramp.

After the generator power has been generated increasingly and is used together with the power of the electrical storage unit to generate the electrical traction power, the internal combustion engine is fully coupled to the output. Full coupling is performed after the increasing generator power has started to be generated. With the complete coupling, the temporary series hybrid operation ends, during which in particular the generator power is generated increasingly.

After the internal combustion engine is fully coupled to the output, the power of the storage unit used for traction is reduced. For example, the electrical power of the storage unit is reduced to a non-positive value, such as in order to then charge the storage unit. A non-positive value of the power of the storage unit is a value that concerns the output power (=discharge power) of the storage unit. A non-positive value of the power of the storage unit (i.e. discharge power or output power) corresponds to a positive charging power or a charging power of zero. Further, after complete coupling, the generator power is adjusted according to a predetermined energy balance. In some examples, after complete coupling of the internal combustion engine to the output, the generator power is no longer generated with the increase with which it was generated before the complete coupling.

In some implementations, the generated traction power (which is the sum of the generator power and the power of the electrical storage unit (i.e., the battery power)) is greater than the electrical power that could be output using the electrical storage unit alone. In some examples, this involves retrieving the maximally available power from the energy storage unit. Furthermore, it may be provided that the electrical traction power produced by the generator power combined with the electrical power of the storage unit is greater than a maximum power conditioned by the design of the storage unit. Further, the electrical traction power may be greater than a maximum power predetermined by an energy management device of the storage unit. However, it is also possible, as shown below, that the power output by the storage unit is not oriented to the maximum possible, but that, for example to protect against overloading or overheating, the power output by the storage unit is smaller than the maximum power deliverable by the storage unit.

Alternatively, in some examples, it would be possible to maintain a certain distance from the maximum output power of the electrical energy storage unit by the method proposed here, in order to prevent a reduction in the energy output capability of the energy storage unit (aerating) due to overheating, etc. In this case, the traction power would not necessarily exceed the maximum power output of the energy storage unit. Further, in this case, the traction power would be equal to the sum of the generator power and the battery power (power of the electrical storage unit) minus a predetermined amount of power. The predetermined amount of power is used to protect the electrical storage unit and prevents it from outputting the maximum possible power. Rather, the electrical storage unit then outputs power that is less than the maximally deliverable power of the storage unit to reduce the load on the electrical storage unit. The amount of power provided for protection by which the power of the storage unit is reduced may depend on the COS, the HOS, or the temperature of the storage unit.

It can thus be provided that, when generating the generator power, the electrical traction power generated by the generator power combined with the electrical power of the storage unit is greater than a maximum power which is conditioned by the design of the storage unit, minus a predetermined power margin which may correspond, for example, to said amount of power. It may also be provided that in this case the traction power is greater than a maximum power which is predetermined by an energy management device of the storage unit, minus a predetermined power margin which may correspond, for example, to the amount of power. In this way, components of the drive are not operated at the maximum operating point, but with a lower load in order to avoid damage that may occur, for example, due to permanently high operating temperatures.

Another aspect is that the internal combustion engine is coupled to the output via a coupling with an increasing degree of coupling. This relates to the step during which the internal combustion engine begins to deliver a positive torque, the step during which increasing generator power is generated, and/or the coupling of the internal combustion engine. The degree of coupling can increase steadily so that there is no jump in traction power. With coupling, the serial operating mode (=internal combustion engine operates the electrical traction drive via generator) of the drive changes to a parallel operating mode (=internal combustion engine acts directly on the output). The parallel operating mode is fully achieved with full coupling. The serial operating mode is terminated with full coupling.

After the internal combustion engine has been fully coupled to the output, the generator power is adjusted in accordance with a predetermined energy balance, where the generator power is being adjusted to an amount of power which corresponds substantially to the consumption of a vehicle electrical system. This vehicle electrical system may be the vehicle electrical system to which the storage unit and the generator device are connected or in which they are provided. Furthermore, the starting device, if electrically operated, may also be connected to the vehicle electrical system.

Here, the generator power can be adjusted to an amount of power that includes the consumption of all electrical components of the vehicle electrical system including a power drain of the electrical storage unit in charging operation. In other words, a charging circuit is provided as one of the components. This charges the storage unit. The charging circuit consumes or absorbs power to be able to charge the storage unit. The power consumed by the charging circuit can be considered as a part of the consumption of all components, especially since the charging circuit is part of the vehicle electrical system. In this case, a positive charging power of the electrical storage unit can be provided when the internal combustion engine is fully coupled to the output (and the starting phase is completed), in contrast to the electrical power that is drawn from the storage unit to generate the traction power (corresponding to a—positive—discharging power) when the internal combustion engine is not or not yet fully coupled.

After or when the internal combustion engine has been fully coupled to the output, the generator power can be adjusted according to a predetermined energy balance, which is variable and which takes into account variable, in particular negative, charging powers of the storage unit during discharge phases (i.e., positive discharge powers of the storage unit). The energy balance may be designed in such a way that the energy requirement of the vehicle electrical system is covered, if necessary including the electrical storage unit that is being charged.

In some examples, after the internal combustion engine has been fully coupled to the output, the electrical (output)

power of the storage unit is set to a value that corresponds to a charging process of the storage unit (or a power transfer of the storage unit from zero). The electrical power of the storage unit may be reduced to zero or to a negative value, for example to a negative value of which the amount corresponds to an amount of power that is linked to a recharging of the storage unit.

A vehicle hybrid drive includes a control device which is set up to execute the method according to one of the preceding claims is also described. The control device has an interface for the input element. The control device is connected to a starting device which is designed to start the internal combustion engine. The control device is connected in an actuating manner to an actuating device (to be understood generally) which is designed to set the electrical power of the electrical storage unit. The term "actuating device" is to be understood as the totality of the actuators which determine the output power and/or the input power of the components. In the case of loads such as heating or lighting components, this is the power they absorb. In the case of a storage unit to be charged, this is the charging power (for example, the power absorbed by a charging device), and, in the case of a storage unit supplying the vehicle electrical system, this is the power that the storage unit outputs. The term "actuating device" thus means the totality of actuators that adjust the powers that the individual components absorb or deliver. The actuators can be simple switches, or actuators that use pulse width modulation, for example, to adjust the power of the component in question in several stages or according to a variable duty cycle.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1 shows an exemplary time curve of the internal combustion engine speed, the generator power, and the electrical power of a vehicle-side electrical storage unit.

The depictions of the variables in FIG. 1 are not to scale, neither on the y-axis nor in the time axis t. The variables are also not shown in any scale relationship to one another. Only the temporal curves are shown for a better understanding of the process described here.

Like reference symbols in the various drawings indicate like elements.

DETAILED DESCRIPTION

Referring to FIG. 1, before time to, the internal combustion engine is inactive, corresponding to an internal combustion engine speed n of 0. In FIG. 1, at time t0, a target traction power is detected (input via an input element) that is above a power G that can be generated with the electric drive, such as a power above the maximum power M of an electrical storage unit. The internal combustion engine is started at time t1; the speed n increases. At time t2, the internal combustion engine reaches an operating state in which it delivers a positive torque, i.e., is able to run independently.

It is proposed to then generate a surplus of electrical energy which is used directly to operate the traction motor (=series hybrid mode).

After the start of the internal combustion engine, the generator torque (or generator power) is built up (substantially simultaneously) and the torque (or the power) of the traction motor, which it delivers to the output, is increased. After the time t2, the generator power LG is steadily increased. Together with the power LB delivered by the electrical storage unit, the electric traction drive is operated by the generator power LG.

The electrical storage unit is generally discharged in this case, since in this mode the limit of the (maximum) discharge power M of the storage unit is typically reached in order to be able to build up as much torque as possible with the traction motor. However, it is also possible for the maximum discharge power to be reached, minus a safety margin S. The maximum discharge power M and the power output by the storage unit LB are shown as dashed lines.

The generator power LG is generated whilst the internal combustion engine is not yet or not yet fully coupled to an output. The coupling process starts at or after the time t2. At time t3, the internal combustion engine is fully coupled to the output. The internal combustion engine then acts directly mechanically on the output (parallel operation).

The excess generator power LG is terminated again immediately after the end of the transition process (i.e., with the complete coupling, time t3), when the internal combustion engine can take over part of the driver's request, i.e., the target traction power or target traction torque.

Then, after the time t3, the electrical power LB of the storage unit used for electrical traction is set to a non-positive value. This results in a predefined transition A of the power LB. The generator power LG is set from or after the time t3 according to a predetermined energy balance. The generator or starter generator can thus remain in generator operation after complete coupling, but with lower torque or lower power than before (for example for on-board power supply). FIG. 1 shows a corresponding reduction V of the generator output LG. The electrical storage unit is then preferably no longer discharged, but can be charged; see charging portion LA of the power LB, which is negative and thus corresponds to a power absorbed by the storage unit. The power LB of the storage unit, positive beforehand, corresponds to a power delivered by the storage unit, such as for traction.

A number of implementations have been described. Nevertheless, it will be understood that various modifications may be made without departing from the spirit and scope of the disclosure. Accordingly, other implementations are within the scope of the following claims.

What is claimed is:

1. A method for changing from electrical operation to hybrid operation in a vehicle hybrid drive, the method comprising:

(a) detecting an increase in a target traction power that is detected via an input element;

(b) starting an internal combustion engine;

(c) when the internal combustion engine starts, outputting a positive torque by way of generating an increasing generator power by a generator device, wherein the generator power is used together with an electrical power of a vehicle-side electrical storage unit for generating electrical traction power, wherein the generator power is generated while the internal combustion engine is not yet or not yet fully coupled to an output;

(d) fully coupling the internal combustion engine to the output after the generation of the increasing generator power has begun; and (e) after the internal combustion engine has been fully coupled to the output:

reducing the electrical power of the storage unit that is used for electrical traction to a non-positive value, and adjusting the generator power in accordance with a predetermined energy balance.

2. The method of claim 1, wherein in step (c) the electrical traction power that is generated by the generator power combined with the electrical power of the storage unit is greater than a maximum power that is conditioned by a design of the storage unit, or is greater than a maximum power that is predetermined by an energy management device of the storage unit.

3. The method of claim 1, wherein in step (c) the electrical traction power that is generated by the generator power combined with the electrical power of the storage unit is greater than a maximum power that is conditioned by a design of the storage unit, minus a predetermined power margin, or is greater than a maximum power that is predetermined by an energy management device of the storage unit, minus a predetermined power margin.

4. The method of claim 1, wherein in step (a) the increase in the target traction power is detected by detection of an actuation strength of an accelerator pedal or a throttle twist grip or a lever or by detection of a driving signal at an interface of a driver assistance or autonomous driving system.

5. The method of claim 1, wherein in step (d), in step (c) or when transitioning from step (c) to step (d) the internal combustion engine is coupled to the output via a coupling with increasing degree of coupling.

6. The method of claim 1, wherein in step (e) the generator power is set to an amount of power that corresponds substantially to a consumption of a vehicle electrical system to which the storage unit and the generator device is connected.

7. The method of claim 6, wherein the consumption of the vehicle electrical system includes the consumption of all electrical components of the vehicle electrical system including a power drain of the electrical storage unit in charging operation.

8. The method of claim 6, wherein the generator power is adjusted according to a predetermined energy balance, which is variable and which takes into account variable, negative, charging powers of the storage unit during discharge phases, wherein the energy balance is designed to arrange for an energy demand of the vehicle electrical system to be covered.

9. The method of claim 1, wherein in step (e) the electrical power of the storage unit is reduced to zero or to a negative value.

10. The method of claim 9, wherein the negative value of which an amount corresponds to an amount of power that is linked to a recharging of the storage unit.

11. A vehicle hybrid drive having a control device comprising:

an interface for an input element; and a starting device for starting an internal combustion engine, wherein the control device is connected to actuators which adjust a power that is received or output by components of a vehicle electrical system, and wherein the control device executes a method for changing from electrical operation to hybrid operation in the vehicle hybrid drive, the method comprising:

(a) detecting an increase in a target traction power that is detected via an input element;

(b) starting the internal combustion engine;

(c) when the internal combustion engine starts, outputting a positive torque by way of generating an increasing generator power by a generator device, wherein the generator power is used together with an electrical power of a vehicle-side electrical storage unit for generating electrical traction power, wherein the generator power (LG) is generated while the internal combustion engine is not yet or not yet fully coupled to an output;

(d) fully coupling the internal combustion engine to the output after the generation of the increasing generator power has begun; and (e) after the internal combustion engine has been fully coupled to the output:

reducing the electrical power of the storage unit that is used for electrical traction to a non-positive value, and adjusting the generator power in accordance with a predetermined energy balance.

12. The vehicle hybrid drive of claim 11, wherein in step (c) the electrical traction power that is generated by the generator power combined with the electrical power of the storage unit is greater than a maximum power that is conditioned by a design of the storage unit, or is greater than a maximum power that is predetermined by an energy management device of the storage unit.

13. The vehicle hybrid drive of claim 11, wherein in step (c) the electrical traction power that is generated by the generator power combined with the electrical power of the storage unit is greater than a maximum power that is conditioned by a design of the storage unit, minus a predetermined power margin, or is greater than a maximum power that is predetermined by an energy management device of the storage unit, minus a predetermined power margin.

14. The vehicle hybrid drive of claim 11, wherein in step (a) the increase in the target traction power is detected by detection of an actuation strength of an accelerator pedal or a throttle twist grip or a lever or by detection of a driving signal at an interface of a driver assistance or autonomous driving system.

15. The vehicle hybrid drive of claim 11, wherein in step (d), in step (c) or when transitioning from step (c) to step (d) the internal combustion engine is coupled to the output via a coupling with increasing degree of coupling.

16. The vehicle hybrid drive of claim 11, wherein in step (e) the generator power is set to an amount of power that corresponds substantially to a consumption of a vehicle electrical system to which the storage unit and the generator device is connected.

17. The vehicle hybrid drive of claim 16, wherein the consumption of the vehicle electrical system includes the consumption of all electrical components of the vehicle electrical system including a power drain of the electrical storage unit in charging operation.

18. The vehicle hybrid drive of claim 16, wherein the generator power is adjusted according to a predetermined energy balance, which is variable and which takes into account variable, negative, charging powers of the storage unit during discharge phases, wherein the energy balance is designed to arrange for an energy demand of the vehicle electrical system to be covered.

19. The vehicle hybrid drive of claim 11, wherein in step (e) the electrical power of the storage unit is reduced to zero or to a negative value.

20. The vehicle hybrid drive of claim 19, wherein the negative value of which an amount corresponds to an amount of power that is linked to a recharging of the storage unit.

* * * * *